(12) United States Patent
Van Haag

(10) Patent No.: US 6,409,644 B1
(45) Date of Patent: Jun. 25, 2002

(54) SAG COMPENSATION ROLL AND PROCESS FOR THE OPERATION THEREOF

(75) Inventor: Rolf Van Haag, Kerken (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/671,255

(22) Filed: Sep. 28, 2000

(30) Foreign Application Priority Data

Oct. 1, 1999 (DE) .......................................... 199 47 398
May 30, 2000 (DE) .......................................... 100 26 939

(51) Int. Cl.⁷ .................................................. B23P 15/00
(52) U.S. Cl. ................................ 492/7; 492/16; 492/20
(58) Field of Search ................................. 492/7, 16, 20

(56) References Cited

U.S. PATENT DOCUMENTS 4,864,703 A 9/1989 Biondetti et al.

FOREIGN PATENT DOCUMENTS

| DE | 3325385 | 1/1985 |
|---|---|---|
| DE | 3822438 | 3/1989 |
| DE | 4015237 | 5/1991 |
| DE | 4011364 | 2/1992 |
| DE | 69608515 | 1/2001 |
| EP | 0332594 | 9/1989 |
| EP | 0570492 | 11/1993 |

*Primary Examiner*—I Cuda-Rosenbaum
(74) *Attorney, Agent, or Firm*—Greenblum & Bernstein, P.L.C.

(57) ABSTRACT

Sag (deflection) compensation roll and process for operating sag compensation roll. The sag compensation roll includes a rotatable roll jacket, a non-rotating carrier being located inside the roll jacket, and a hydraulic support element arrangement being located between the carrier and the roll jacket. A bearing ring is located at each end of the roll jacket, the bearing rings are movable relative to the carrier in a press plane, and a bearing arrangement is located between the bearing rings and the roll jacket. The bearing arrangement includes at least three support elements distributed in a circumferential direction. At least one of the at least three support elements is movable with respect to the bearing ring. The process includes supplying the bearing pockets with a constant volume flow of hydraulic fluid, and driving at least one support element into the bearing ring under load up to the fixed position.

26 Claims, 7 Drawing Sheets

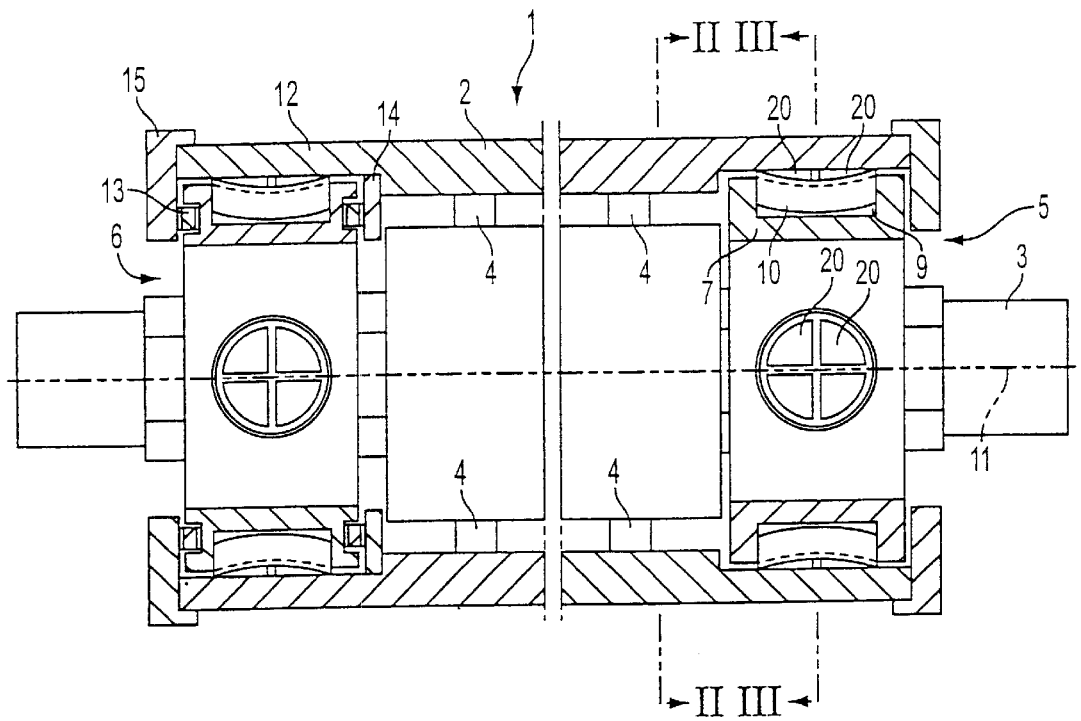
FIG. 1
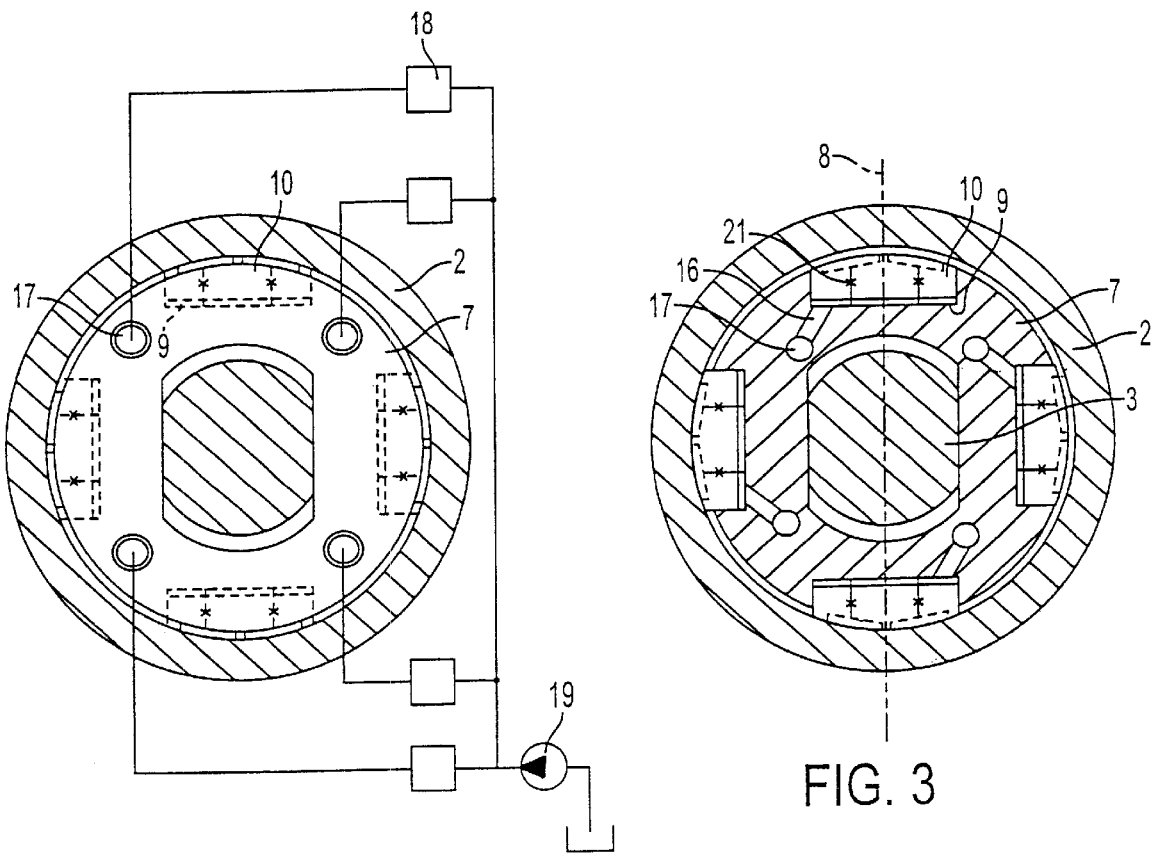
FIG. 2
FIG. 3

SAG COMPENSATION ROLL AND PROCESS FOR THE OPERATION THEREOF

CROSS REFERENCE TO RELATED APPLICATIONS

The present application claims priority under 35 U.S.C. §119 of German patent application No. 199 47 398.6, filed Oct. 1, 1999 and of German Patent Application No. 100 26 939.7, filed May 30, 2000, the disclosures of which are expressly incorporated by reference herein in their entireties,

BACKGROUND OF THE INVENTION

1. Field of the Invention

The invention relates to a sag (deflection) compensation roll with a rotatable roll jacket, a non-rotating carrier arranged inside the roll jacket, and a hydraulic support element arrangement between the carrier and the roll jacket. A bearing ring is located at each end of the roll jacket, which can be moved relative to the carrier in a press plane, and a beating arrangement is located between the bearing ring and the roll jacket.

The invention also relates to a process for operating a sag compensation roll with a roll jacket that rotates around a carrier and is supported in the area of each of its axial ends by a bearing arrangement that has a bearing ring and at least three hydrostatic support elements with bearing pockets distributed over the bearing ring in the circumferential direction.

2. Discussion of Background Information

Such a sag compensation roll is known from, e.g., EP 0 332 594 B1. In operation, the roll jacket rotates around the carrier. Sags that might result from a loading of the roll jacket are accepted by the hydraulic support element arrangement that supports the roll jacket from inside against the carrier. While this does lead to a sagging of the career under certain circumstances, the elastic line of the roll jacket can correspondingly be better influenced.

The support element arrangement, however, can only accept forces that act in the press plane, for example, that are produced by an opposing roll or an adjacent roll stack. It is also necessary for the roll jacket to be held on the carrier with a bearing that allows the roll jacket to rotate against the carrier and simultaneously allows a certain positioning.

This bearing or, more generally, this bearing arrangement, is loaded differently in different situations. In operation, the roll jacket is supported against the carrier by the hydrostatic support elements. Thus, the bearing arrangement can be held virtually free of support forces, at least with a vertically oriented roll stack, in which the support elements also produce a vertically oriented force component between the carrier and the roll jacket. The weight of the roll jacket itself and the forces acting in the press direction, which are applied by other rolls, are absorbed by the support elements between the roll jacket and the carrier. In this case, the bearing arrangement serves virtually exclusively to position the roll jacket against the carrier. When the nips of the roll stack are opened, the weight of the roll jacket rests on the bearing arrangement. In this case, the bearing arrangement must be capable of accepting this weight, even when the roll jacket rotates. In all cases, it must be ensured that the bearing arrangement runs with the smallest possible amount of play, which must not exceed a predetermined amount.

In the known case, this bearing is formed by a roll body, as is customary in the state of the art. It has been found, however, that such roll bearings no longer work with the necessary reliability when the rolls run ever faster.

SUMMARY OF THE INVENTION

The present invention provides a sag (deflection) compensation roll which is operable at a higher operating speed.

The sag compensation roll of the instant invention includes a bearing arrangement formed by at least three hydrostatic support elements which are distributed in the circumferential direction. At least one of the at least three hydrostatic support elements can move with respect to the bearing ring.

It is thus possible to operate a sag compensation roll with a jacket lift even at higher speeds, i.e., circumferential speeds on the order of magnitude of about 2000 m/min and above. The presence of at least three support elements distributed in the circumferential direction allows a defined supporting in all radial directions. Since at least one, but preferably several or even all, of the support elements can move against the bearing ring, they are capable of self-adjusting even when there are diameter changes of the roll jacket and/or the bearing ring or the carrier, which do not always need to run alike. Thus, they are able to guarantee that the roll jacket is always supported to the desired extent. Plays, as are known from roll bearings and that could lead under certain circumstances to an unfavorable oscillation behavior of the roll during operation, are kept very low with this type of bearing. In addition, the hydrostatic support of the roll jacket in the area of the rotation bearings enables relatively low-wear operation, even at higher speeds.

The fact that, in a preferred embodiment, the effective surface of the bearing pocket arrangement, i.e., the area in which the pressure can act between the roll jacket and the support element, is greater than the effective surface between the support element and the bearing ring, ensures that the support element can indeed be pressed into the bearing ring with a certain force when corresponding forces act on the roll jacket. Since hydraulic pressures build up above and below the support element, however, the force with which the support element lies against the bearing ring remains limited. Its magnitude can be influenced by the difference in area. This results in a stable support, even when the diameters of the roll jacket change. It is virtually always ensured that the roll jacket can slip on a film of fluid.

It is also preferred for the support element to be able to be driven into the bearing ring under load up to its fixed position. No relative movement that could lead to friction occurs between the foot surface of the support element and the bearing ring, so that it can certainly be accepted here that the support element can be driven into the bearing ring "up to the stop." During operation, the roll jacket is supported in the known manner, e.g., by the support elements between the carrier and the roll jacket or else by further rolls arranged below the roll jacket, which rolls form a nip with the sag compensation roll in question. In this case, the bearing arrangement is virtually free of external support forces. It serves primarily to position the roll jacket against the carrier. Owing to the at least one movable support element between the bearing ring and the roll jacket, it is possible to design the bearing arrangement with a decidedly small amount of play. The support elements can be held always in the immediate vicinity of the inside of the roll jacket, with the formation of a fluid film of the hydraulic fluid.

It is also advantageous if the bearing pocket arrangement is connected with a supply device that delivers a constant volume flow of hydraulic fluid. Owing to the supplying of the bearing pockets with a constant volume flow of the hydraulic fluid, changes in loading can also be received without difficulty, Even when the weight of the roll jacket must be carried by the bearing arrangement, a reliable support is possible without difficulty. The support element lying against the direction of the force of gravity is thus driven into the bearing ring up to the stop, i.e., into its fixed position. The supplying of the bearing pockets with a constant volume flow of the hydraulic fluid, however, still ensures that the fluid film is maintained between the support element and the roll jacket, largely independently of the loading. A constant pressure difference prevails between the cylinder chamber below the support element and the hydrostatic pocket between the support element and the roll jacket, owing to the constant volume flow of hydraulic fluid. By applying load to the roll, the support element facing the nip is supported on the floor of its cylinder bore. Since its capillary continues to be supplied with hydraulic fluid, however, and at a constant volume flow, the pressure will rise in the pockets. At every load, the pressures in the pockets adjust automatically. By the constant volume flow, it is possible to ensure that the support function is maintained for each support element, independently of the load.

The bearing pocket arrangement is preferably connected to a pressure chamber between the support element and the bearing ring via a capillary arrangement traversing the support element. A drop in pressure that ensures that a certain gap is always present between the support surface of the support element adjacent to the roll jacket can be achieved via the capillary arrangement. Owing to the supply device that delivers a constant volume flow of hydraulic fluid, a constant pressure difference prevails between the cylinder chamber below the support element and the hydrostatic pocket between the support element and the roll jacket. By the application of load on the roll, the support element facing the nip is supported on the floor of its cylinder bore. Since its capillary continues to be supplied with hydraulic fluid, however, at a constant volume flow, the pressure in the pockets will rise. At every load, the pressures in the pockets adjust automatically. By the constant volume flow, it is possible to ensure that the support function is maintained for each support element independent of the load, even when the support element is inserted up to the stop.

The capillary arrangement is preferably dimensioned so that, in the unloaded state, a predetermined initial stressing force is not exceeded, and, at a predetermined loading, a predetermined minimum gap height is substantially guaranteed. The unloaded state is easy to ascertain. The capillary arrangement is dimensioned so that, in the unloaded state, an adequate amount of hydraulic fluid can flow to the bearing pocket arrangement, so that the pressure in the pressure chamber does not exceed a predetermined value. Thus, in the unloaded state, too strong a loading of the roll jacket is prevented. Vice versa, the throttle resistance of the capillary arrangement must not be too low, so that at every load it is guaranteed that the gap between the support element and the roll jacket is maintained at a predetermined order of magnitude.

Here, it is particularly preferred for the supply device to be matched to the capillary arrangement such that, at maximum load, a minimum gap in the range of about 20 to 30 $\mu$m results between the support element and the roll jacket. This gap is sufficiently wide to prevent damage to the roll jacket by being placed on the support element. However, it is small enough for the support element to sufficiently throttle the oil flow, so that fluid consumption remains at a reasonable level.

It is advantageous for the movable support elements to have a lift height with respect to the bearing ring in the radial direction that corresponds to a maximum change resulting from thermal differences in diameter and/or roll jacket or carrier deformations arising from nip loads. Therefore, lift height will be limited to very small values. The lift must be only so great that the above-mentioned changes resulting from thermal differences in diameter and deformations of the roll jacket or the axles arising from nip loads can be compensated for. The jacket lift of the roll is performed by guiding the bearing ring on the carrier. Owing to the very small lift height, a relatively precise guiding is possible in the bearing ring over the entire working area of the support elements. This again improves the operating properties of the roll.

Here, it is particularly preferred for the lift height to be in the range of about 0.1 to 0.5 mm. This corresponds essentially to the play of a C3 self-aligning roller bearing, where it is guaranteed by the lift height that no play occurs with the support described.

Preferably, at least one support element has a curved floor on its underside facing the carrier. This holds true in any case for the support element that is pressed further into the bearing ring when there is a pressure impact on the roll jacket in the press plane. The curved floor prevents the support element from being placed with an edge on the floor of the cylinder bore when the carrier is curved by loading. This reduces wear. A hydrostatic bearing for a roll with a jacket lift is made available that meets the requirements of a bending carrier relatively well. The curved floor of the support element can either sit directly on the floor of the cylinder bore and "roll off" there when the carrier is curved by loading. It is also possible, however, to arrange a ring or another correspondingly concave support surface on the floor of the cylinder bore, on which the support element lies. In this case, the support element continues to be supported flat on the floor of the cylinder bore and can nevertheless incline.

In an alternative embodiment, it is provided that at least one support element is arranged in a cylinder housing and has a concave floor supported on the carrier on a correspondingly shaped convex surface. In this case as well, it is permissible for the carrier to sag. Here, however, the support element remains aligned with the cylinder bore in the cylinder housing. The complete cylinder housing can then be displaced on the arched surface. A full-surface support is maintained here as well.

Preferably, the support elements at one end of the roll have a curved support surface lying against a similarly curved bearing surface on the inside of the roll jacket. With this embodiment, an axial bearing of the roll jacket with respect to the bearing ring is achieved on one side in a relatively simple manner. Owing to the curvature of the bearing surface, the roll jacket cannot be displaced axially against the support element.

Here, it is particularly preferred for the support surface to be curved in a circular line resulting in a radial section. With this embodiment, in addition to the axial supporting, the effect is also achieved that the carrier can sag with respect to the roll jacket without the support properties of the support elements being impaired to a significant extent. When the carrier sags, the support surface travels with its surface along this circular line, but continues to support the roll jacket reliably.

In an alternative or additional embodiment, it can be provided that a bearing ring lies against the roll jacket axially via hydrostatic slip surfaces. In this manner, a fixed bearing can be implemented at one axial end of the roll.

Preferably, the bearing rings are arranged on end sections of the carrier that have a smaller diameter than a section of the carrier axially between the end sections. Two advantages are gained thereby. In particular, there is enough space available that can be used to accommodate the bearing rings and the support elements. Moreover, the carrier is dimensioned sufficiently amply in the middle range over the greatest part of its length to be able to support the hydraulic support element arrangement. This again has the result that the sagging of the carrier and thus also the inclination of the support elements to the roll jacket can be kept small.

A spring is preferably arranged between the bearing ring and the support element. As explained above, the support elements are acted upon with a constant volume flow that also reaches the bearing pockets. The support elements have only a small lift in the bearing ring, corresponding approximately to the bearing play of a roll bearing. In the case of a pending bearing force, the loaded support elements are driven into the bearing ring to the stop or into their fixed position. In this case, the pressure over the support element rises until an equilibrium of forces is reached. Since, owing to the constant volume stream, the pressure under the support elements also rises, the bearing force of the support element on the bearing ring is very small in relation to the total force that the support element absorbs. It depends on the ratio of the bearing pocket surface area to the piston surface area of the support element. With a customary surface area ratio of about 1.1, the bearing force thus amounts to only about 10% of the support element force. Through this high transmission ratio, it is also possible to receive the force under the support element by a commercial resilient spring, e.g, a cup spring. This offers further advantages, as will be described below.

The support element preferably has a stop that can be moved parallel to the spring, which stop comes to rest on the bearing ring after a predetermined spring displacement. With this embodiment, the force-displacement characteristic of the support element can be designed individually. A linear force-displacement characteristic is obtained when the support element is seated on a spring. In contrast, if the support element is driven to its fixed position, when the stop comes to rest on the bearing ring, the change in displacement over the change in force is virtually nonexistent. Therefore, by combining these two cases, a spring characteristic can be set within wide limits.

It is also preferred for the maximum spring displacement to be shorter than the maximum lift of the support element. In this case, a further property can be incorporated into the force-displacement curve. A support element that can move freely produces a constant adjusting force during the displacement. Therefore, if the above-mentioned force-displacement relationships are combined with the constant force-displacement curve, it is already possible to implement three different segments in the force-displacement relationship.

The support surface preferably has at least one tapered approach edge. This sloped edge creates a hydrodynamic "carrying zone." This leads to improved emergency running properties and lower energy consumption.

A force device is preferably arranged between the carrier and the bearing ring, to acts in the radial direction in a press plane. It is thus possible to apply additional forces to the roll jacket in the bearing area as well. In this case, the great advantage of the seating of the roll jacket on the bearing ring via the support elements is shown in that the support elements can pass along this additional force in a virtually wear-free manner.

A throttle is preferably arranged in a feed line to the pressure chamber. This has an advantageous effect on the oscillation behavior. Throttles are known per se.

Further, the present invention is directed to a process of the type mentioned at the outset which also provides that the bearing pockets are supplied with a constant volume flow of hydraulic fluid and at least one support element is driven into the bearing ring under load as far as its fixed position. A defined position is created for the corresponding support element by the fixed position. The support element is then supported directly by the bearing ring. Because the bearing pockets are supplied with a constant volume flow of hydraulic fluid, it continues to be ensured that a fluid film can be maintained between the roll jacket and the support element in this state as well. During normal operation, in which the weight of the roll jacket is received in a different manner, the support element can be drawn out again somewhat. This ensures that the roll jacket is always supported virtually free of play, even during small changes in its geometric dimensions, as may be caused by thermal influences, for example.

Here, it is preferred for the hydraulic fluid to be conducted in the support element through a capillary arrangement. Owing to the constant volume flow, a constant pressure drop is produced in the capillary arrangement, which pressure drop moves the support element into a situation of equilibrium between the bearing ring and the roll jacket. The support element is, so to speak, gripped between two cushions of fluid, i.e., the fluid film between the roll jacket and the support element, and fluid in the pressure chamber between the support element and the bearing ring. Only when the forces acting on the support element become too great is the support element driven into its fixed position on the bearing ring. However, even in this state, provision is made for the hydraulic fluid still to reach the bearing pocket arrangement through the capillary arrangement.

The effective surface of the bearing pocket arrangement is preferably made greater than the cross section surface of the support element in the bearing ring. In this manner it is guaranteed that the pressure drop can be compensated for via the capillary arrangement as far as its force is concerned.

The present invention relates to a sag (deflection) compensation roll that includes a rotatable roll jacket, a non-rotating carrier being located inside the roll jacket, and a hydraulic support element arrangement being located between the carrier and the roll jacket. A bearing ring is located at each end of the roll jacket, the bearing rings are movable relative to the carrier in a press plane, and a bearing arrangement is located between the bearing rings and the roll jacket. The bearing arrangement includes at least three support elements distributed in a circumferential direction. At least one of the at least three support elements is movable with respect to the bearing ring.

In accordance with a feature of the present invention, the at least three support elements may include at least three hydrostatic support elements.

According to another feature of the invention, the at least one movable support element can include a bearing pocket arrangement having an effective surface which is greater than a surface of the movable support element on which a pressure acts between the bearing ring and the support element. Under load, the movable support element can be driven into the bearing ring up to a fixed position. A supply device can be arranged to deliver a constant volume flow of hydraulic fluid, and the bearing pocket arrangement may be coupled to the supply device. Further, a pressure chamber can be located between the support element and the bearing ring, and the movable support element may include a capillary arrangement positioned to couple the bearing pocket arrangement to the pressure chamber. The capillary arrangement is dimensioned so that, in an unloaded state, a predetermined initial stressing force is not exceeded, and, at a predetermined load, a predetermined minimum gap height is attained. The supply device is matched to the capillary arrangement so that, under maximum load, a minimum gap in the range of between about 20–30 μm can be formed between the support element and the roll jacket.

In accordance with still another feature of the present invention, the at least one movable support element has a lift height with respect to the bearing ring in a radial direction which corresponds to a maximum change resulting from thermal differences in one of (a) at one of least one of diameter ad roll jacket and (b) carrier deformations arising from nip loads. The lift height can be in a range of between about 0.1–0.5 mm, and preferably in a range of between about 0.1–0.3 mm.

According to a further feature of the instant invention, at least one of the at least three support elements can have a curved floor on an underside positioned to face the carrier.

At least one of the at least three support elements maybe arranged in a cylinder housing having a concave curved floor which is supported on a correspondingly curved convex surface a side of the carrier.

Moreover, the support elements at one end of the roll may include a curved support surface arranged to lie against a similarly curved bearing surface on an inner side of the roll jacket. The curved support surface may be curved along a circular line which results in a radial section.

According to another feature of the invention, one of the bearing rungs can be axially positioned against the roll jacket via hydrostatic slip surfaces.

In accordance with a still further feature of the present invention, the bearing rings may be arranged on end sections of the carrier, and the end sections may have a smaller diameter than a section of the carrier axially between the end sections.

A spring may be arranged between the bearing ring and the support element. The at least one movable support element can have a stop that can be moved parallel to the spring, and the stop can come to rest against the bearing ring after a predetermined spring displacement. A maximum spring displacement can be shorter than a maximum lift of the at least one movable support element.

In accordance with another feature of the invention, a support surface of the at least one movable support element can include at least one tapered approach edge.

According to still another feature of the instant invention, a force device tan be arranged between the carrier and the bearing ring, which acts in a radially oriented press plane.

The at least one movable support element may be positioned for movement within a pressure chamber in the beating ring, and the roll can further include a throttle arranged in a line coupled to the pressure chamber.

The present invention is directed to a process for operating a sag compensation roll having a roll jacket that rotates around a carrier and that is supported in the area of its axial ends by a bearing arrangement having a bearing ring and at least three hydrostatic support elements with bearing pockets circumferentially distributed over the bearing ring. The process includes supplying the bearing pockets with a constant volume flow of hydraulic fluid, and driving at least one support element into the bearing ring under load up to the fixed position.

In accordance with yet another feature of the present invention, the process can include conducting the hydraulic fluid in the support element through a capillary arrangement. An effective surface of the beating pocket arrangement may be formed to be greater than a cross sectional surface of be support element in the bearing ring.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples exemplary embodiments of the present invention, in which like reference numerals represent similar parts throughout the several views of the drawings, and wherein:

FIG. 1 illustrates a longitudinal section through a first embodiment of a roll in accordance with the present invention;

FIG. 2 illustrates section II—II depicted in FIG. 1;

FIG. 3 illustrates section III—III depicted FIG. 1;

DETAILED DESCRIPTION OF THE PRESENT INVENTION

Figure 4:
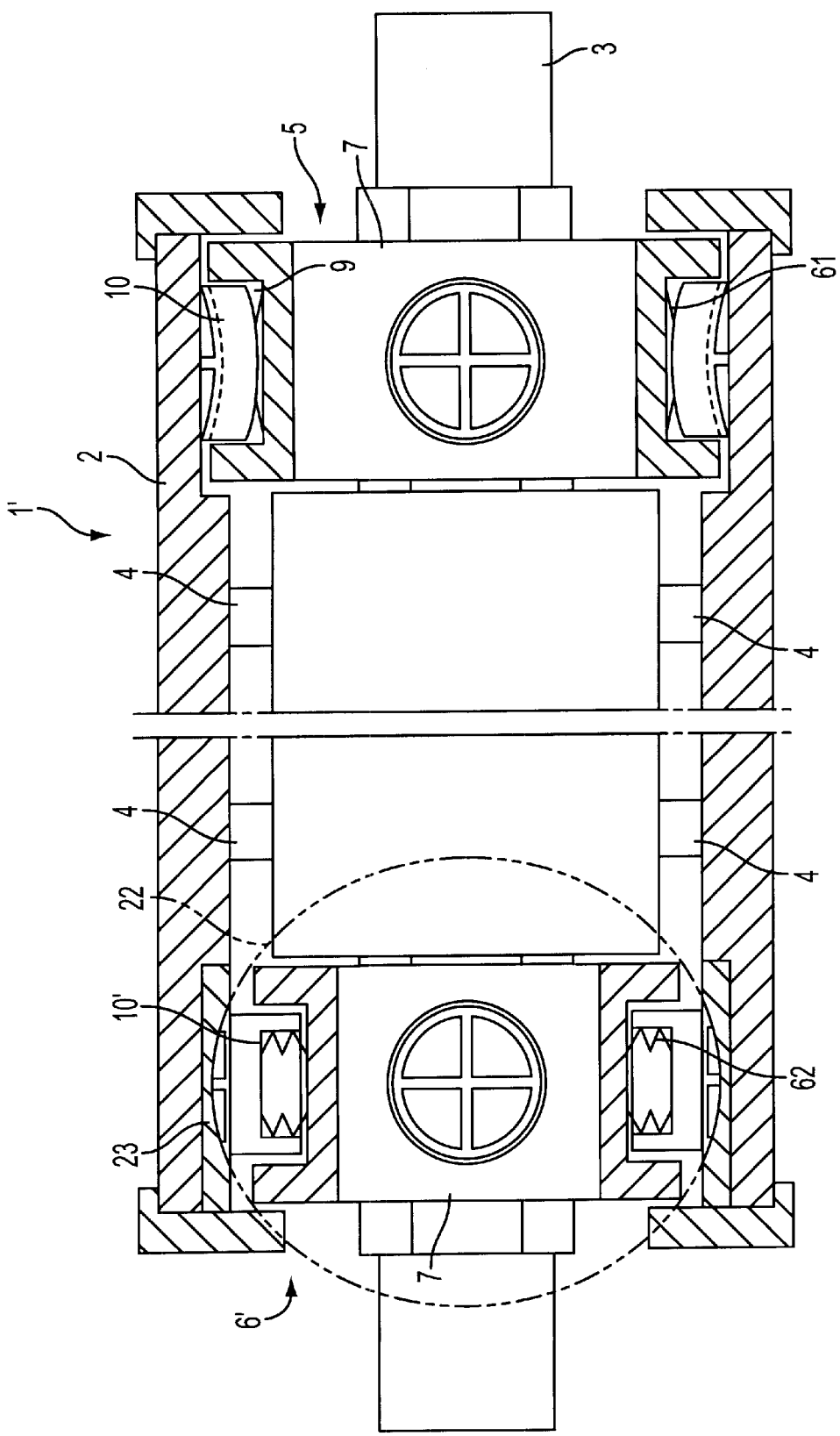
FIG. 4 illustrates a second embodiment of a roll according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention more detail than is necessary for the fundamental understanding of the present invention, the description taken with the drawings making apparent to those skilled in the art how the several forms of the present invention may be embodied in practice.

FIG 1. shows a sag compensation roll 1 with a roll jacket 2 that is supported on a carrier 3 via a hydraulic support element arrangement 4 (shown schematically). Roll jacket 2 is designed, e.g., as a roll tube, i.e., it surrounds a cavity in which carrier 3 is arranged. Here, carrier 3 is held so that it cannot rotate, while jacket 2 can rotate around carrier 3.

Roll jacket 2 is pivoted at both its axial ends on carrier 3 via a bearing 5, 6 respectively. Bearing 5 is designed here as a movable bearing and bearing 6 as a fixed bearing.

As can be seen in particular from FIGS. 2 and 3, bearing 5 has a bearing ring 7 that can be displaced parallel to a press plane 8, in which roll 1 can be acted upon with pressure by an opposing roll (not shown in greater detail). Relative to the representation of FIGS. 1 to 3, roll jacket 2 can therefore be moved upwardly and downwardly with respect to carrier 3. Such a roll 1 is also called a roll with a jacket lift. Therefore, the movement is performed in that bearing ring 7 is movable with respect to carrier 3. The movement can be controlled by support element arrangement 4.

In the circumferential direction, bearing ring 7 has four evenly distributed cylinder bores 9, in each of which a support element 10 is arranged. Support element 10 can be radially driven in bearing ring 7 (i.e., relative to rotational axis 11 of roll jacket 2). However, the possible lift can be limited here to very small ranges, i.e., it need only correspond to the play of a C3 self-aligning roller bearing, and, therefore, is on the order of magnitude of about 0.1 to 0.5 mm and preferably only in the range of about 0.1 to 0.3 mm. This lift movement is sufficient to accept deformations resulting from thermal differences in diameter or from roll jacket or carrier deformations that may arise from nip loads.

As can be seen in particular from FIG. 1, each support element 10 is curved on its side facing axis of rotation 11, i.e., at its radially inner end. When support element 10 is pressed into bearing ring 7 up to the stop owing to a loading of roll jacket 2, then, even when carrier 3 sags, it is not possible for the situation to arise in which the support element sits with one edge on the floor of cylinder bore 9. Rather, a flat contact is produced in each case.

In the present example, as can be seen from FIGS. 2 and 3, four support elements 10 are provided. However, three support elements are also sufficient to ensure the seating of roll jacket 2 on carrier 3 with the necessary certainty.

Fixed bearing 6 is formed exactly like movable bearing 5, except that hydrostatic support elements 12, 13 are additionally provided to interact with axial stops 14 and 15 on roll jacket 2.

In all cases, a pressure chamber is formed in cylinder bores 9 between support elements 10 and carrier 7, even when support element 10 is driven into bearing ring 7 up to the stop. This is achieved, among other things, by the curved underside of support elements 10. As can be seen from FIG. 3, each cylinder bore 9 is connected by a channel 16 to a supply line 17 through which a hydraulic fluid is fed under pressure. This is also depicted in FIG. 2, where the mouths of supply lines 17 can be seen. Each supply line 17 is connected via a regulator 18 to a pump 19. Regulators 18 ensure that a constant volume flow always reaches the pressure pocket of respective cylinder bore 9 through line 17.

In the present case, each support element has four pressure pockets 20, each of which is connected via a capillary 21 to the pressure chamber in cylinder bore 9. Each capillary 21 forms a throttle line. Because of the constant volume flow into each pressure chamber, a constant volume flow is also produced at least in the totality of capillaries 21 of each support element 10. The pressure drop over support element 10 is correspondingly the same in each case. The pressure drop in capillary 21 can be selected that, even under the most severe loading of roll jacket 2, a minimum gap, which is in the range of 20 to 30 $\mu$m, always remains between the radially outer side of support element 10, i.e., the support surface, and the inner side of roll jacket 2.

An example is shown in which a common pump 19 is provided for all support elements 10, but each support element 10 has its own regulator 18. However, it is also possible for each support element 10 to have its own regulated pump 19.

In the unloaded state, all support elements 10 are drawn out of bearing ring 7 by about the same distance, however, the weight of roll jacket 2, may cause small differences. By the application of load to roll jacket 2, support element 10 facing the nip will be supported on the floor of cylinder bore 9. However, since the capillaries 21 continue to be supplied with oil at a constant volume flow, the pressure in pressure pockets 20 will rise. Therefore, at every load, the pressures in pressure pockets 20 automatically adjust.

The dimensioning of pump 19, can be determined beforehand from the known pressure difference and the likewise known maximum loading of roll 1. The pressure is generally above about 100 or even above about 150 bar. Since the support elements can be driven radially, changes in the diameter of the roll jacket caused, e.g., by a change in temperature, can be compensated for.

Bearings rings 7 are arranged at the end sections of the carrier, where carrier 3 has a reduced diameter. The diameter can be further reduced further axially outwardly, where the carrier is normally suspended or fixed.

In the area where bearing rings 7 are arranged, carrier 3 is flattened parallel to press plane 8. Bearing 7 has correspondingly flat areas of contact on its inner side, so that roll jacket 2 can be raised or lowered with the aid of bearing ring 7 until bearing ring 7 meets carrier 3 in one or the other direction.

FIG. 4 shows an alternative embodiment in which the same parts are provided the same reference numbers. Parts that correspond to those of FIGS. 1 to 3 provided with reference numbers followed by the prime symbol.

The form of fixed bearing 6' has changed. Support elements 10' have a support surface that in the sectional view shown in FIG. 4 lies on a circular line 22. On its radial inner side, roll jacket has an insert 23 that forms a bearing surface against which lie the support surfaces of support elements 10'. This bearing surface off insert 23 is correspondingly curved and also lies on the circular line 22.

Two effects are achieved with this embodiment: Roll jacket 2 is fixed axially against bearing ring 7 of fixed bearing 6', i.e., it cannot be displaced in the axial direction, and it is now possible for bearing ring 7 to tilt when carrier 3 sags and thus for support elements 10' to be placed "diagonally" against roll jacket 2. The support surfaces continue to work exactly as before, however, because they lie against a corresponding bearing surface.

Additionally, in FIG. 4, support elements 10, 10' are supported on their bearing ring via springs 61, 62. Right support element 10 is supported by, e.g., a cup spring 61, arranged between the floor of cylinder bore 9 and support element 10. Left support element 10' can optionally be supported by, e.g., several coil springs 62 arranged between the floor of corresponding cylinder bore and support element 10'. Support element 10' can also optionally have a recess for this purpose, as shown.

Figure 5:
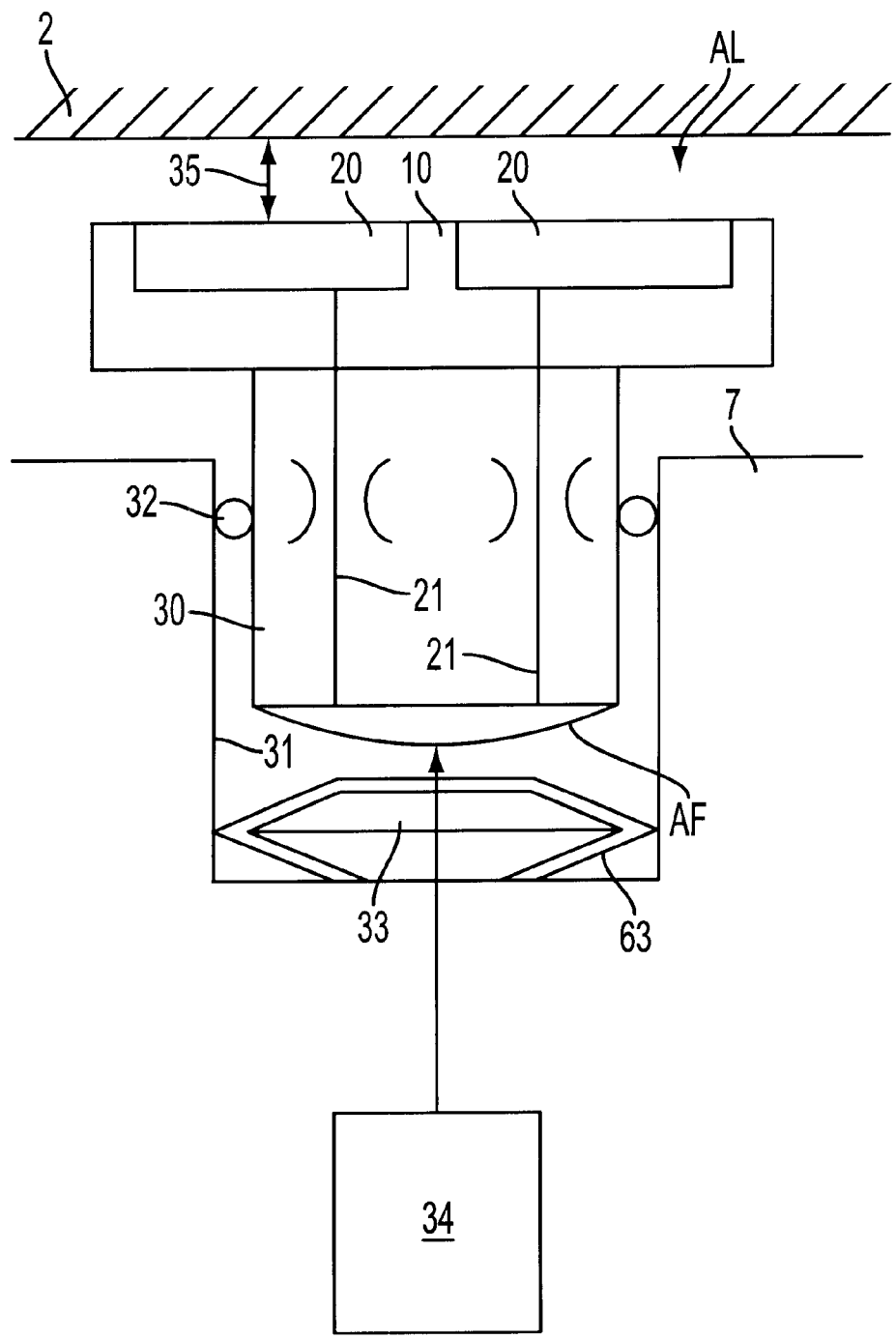
FIG. 5 schematically illustrates force relationships in accordance with the invention.

FIG. 5 shows a schematic view of a support element 10 of a modified embodiment in a greatly enlarged representation. Support element 10 is set into bearing ring 7 or, more precisely, into a corresponding bore 31, with a foot 30. Foot 30 can also be sealed against bore 31 with seals 32.

On its side facing roll jacket 2, support element 10 has a bearing pocket arrangement 20, whose effective surface AL is greater than a surface AF formed by the face of foot 30 and corresponding to the cross section of foot 30. Here, foot 30 and bore 31 form the boundary of a pressure chamber 33 hereby.

Support element 10 is provided with a capillary arrangement formed by several capillaries 21. Each bearing pocket 20 is connected to pressure chamber 33 by at least one capillary 21. The throttle resistances between individual bearing pockets 20 and pressure chamber 33 are the same for all bearing pockets 20.

Pressure chamber 33 is supplied with a constant volume flow of hydraulic fluid by a schematically shown regulator 34. This fluid now enters bearing pockets 20 via capillaries 21 and from there through gap 35 into the chamber between roll jacket 2 and bearing ring 7, as is known from hydrostatic support elements 4.

The maximum loading of roll jacket 2 is known. Capillaries 21 are dimensioned so that, even under the greatest loading that occurs, gap 35 still has a width in the range of about 20 to 30 $\mu$m. Otherwise, capillaries 21 are dimensioned so that, when the roll is not loaded, the initial stressing force of support element 10 against roll jacket 2 is not too high.

During the highest loading that occurs, support element 10 can be driven into bearing ring 7 up to the stop. This is the only situation in which a distribution of force could occur between roll jacket 2, support element 10, and bearing ring 7, in which the force between bearing ring 7 and support element 10 is lower than the force between roll jacket 2 and support element 10. The supply by regulator 34 must therefore be dimensioned so that this situation does not occur, i.e., it must always be ensured that adequate amounts of hydraulic fluid can overflow from bearing pockets 20 into gap 35 between roll jacket 2 and support element 10.

With the support element shown in FIG. 5, a spring 63 is also arranged in pressure chamber 33 that is formed, e.g., as a cup spring. The proportions in FIG. 5 are shown an exaggerated scale for reasons of clarity. This is also true for the distances between the individual parts, namely roll jacket 2, support element 10, and the floor of cylinder bore 31. It can be seen, however, that, in the "farthest" outward position of support element 10, a distance exists between the floor of support element 10 and spring 63, ie., the lift of support element 10 is greater than the maximum extension of spring 63. Therefore, the support element can be driven for a certain distance into cylinder bore 31, without an increase in force being necessary therefor.

Figure 6:
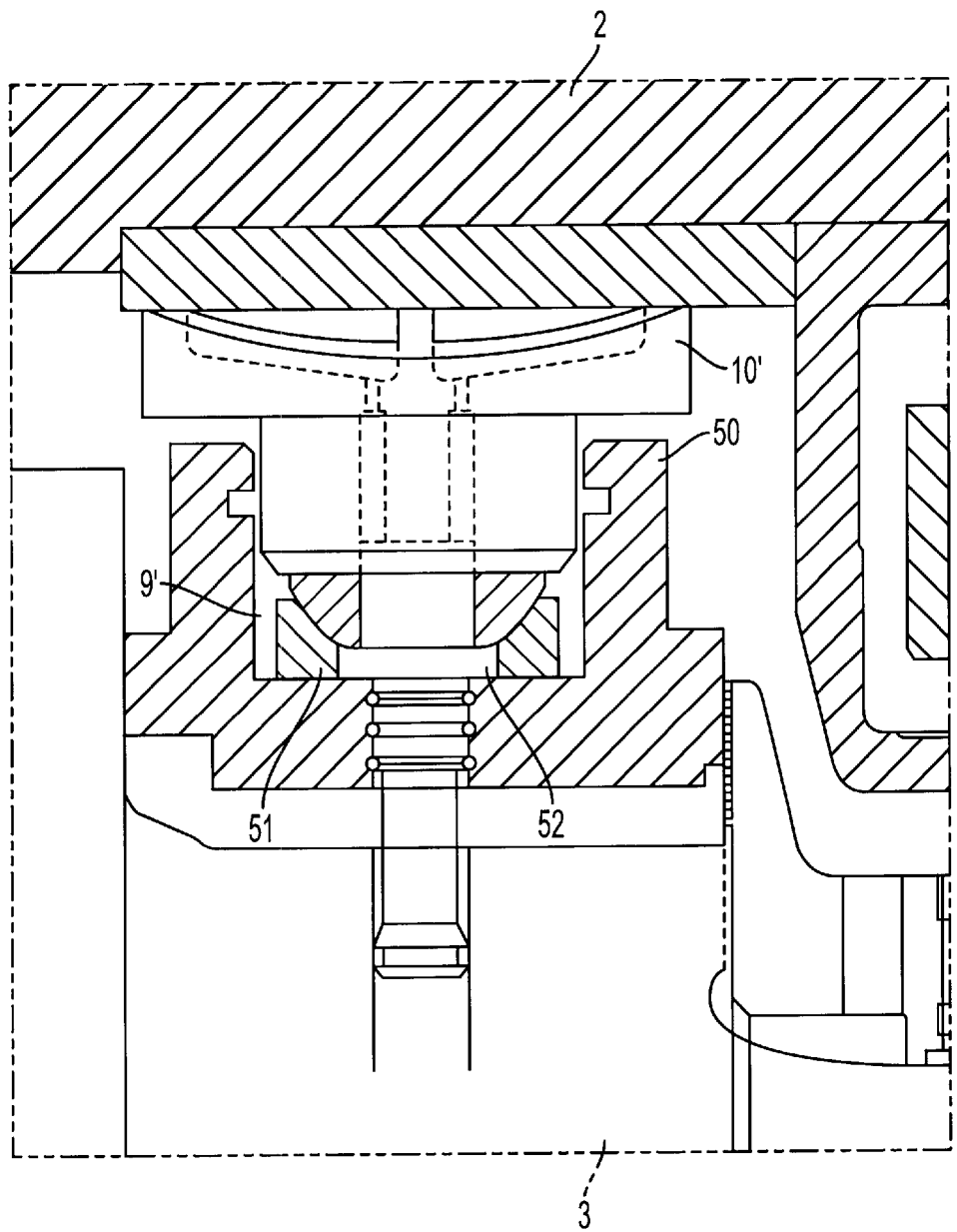
FIG. 6 illustrates an enlarged representation of a third embodiment of a support element according to the invention.

FIG. 6 shows in an enlarged representation a support element 10' arranged in a cylinder housing 50, with cylinder housing 50 being fixed on carrier 3. Like support element 10 in FIG. 1, the floor of support element 10' has a convex curve. In contrast to the embodiment according to FIG. 1, however, the floor of support element 10' does not lie directly on the floor of cylinder bore 9', but lies on a bearing ring 51, which has a correspondingly concave curve. When support element 10' now inclines in cylinder bore 9', it continues to be supported flat on ring 51, but avoids tilting. Ring 51 encloses an aperture 52, through which hydraulic fluid can be fed in a known manner. In the unloaded state, support element 10' can lift from ring 51.

Figure 7:
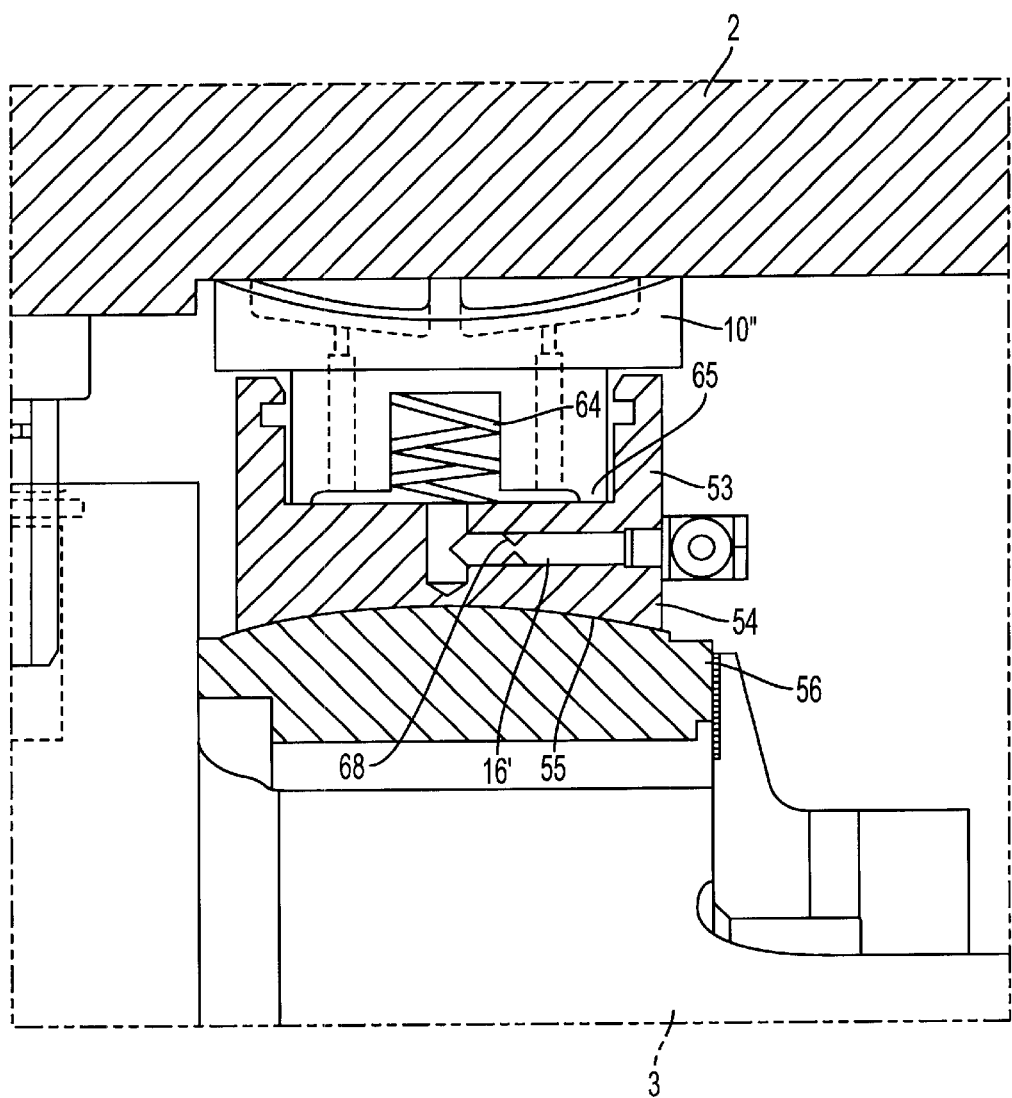
FIG. 7 illustrates an enlarged representation of a fourth embodiment of a support element according to the invention.

FIG. 7 shows an alternative embodiment. In this case, support element 10" is arranged a cylinder body 53, Cylinder body 53 has a concave floor surface 54, which is supported on a convex mating surface 55 of a component 56 fixed on carrier 3. Of course, mating surface 55 can also be produced directly on the carrier.

In such an embodiment, it is also possible for carrier 3 to sag. In this case, cylinder body 53 is displaced on component 56 so that support element 10" can maintain its orientation to roll jacket 2.

A spring 64 is also provided for support element 10". Support element 10" has a stop 65, however, with which support element 10" can be driven into the fixed position in spite of the presence of spring 64. The effects of the various spring constellations is to be explained in more detail on the basis of FIG. 8.

Figure 8A:
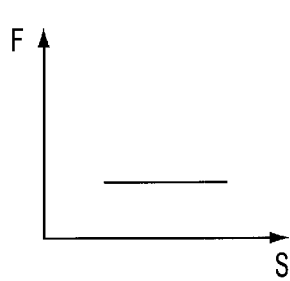
FIGS. 8a–8d illustrate various force-displacement curves.
Figure 8B:
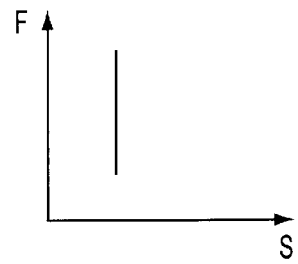
Figure 8C:
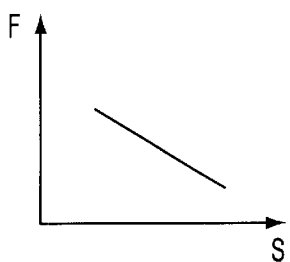

FIG. 8c shows the normal curve of a force F over a displacement s when support element 10 is supported by springs 61–64 over its entire lift. This is the typical linear force displacement characteristic of a spring.

Figure 8D:
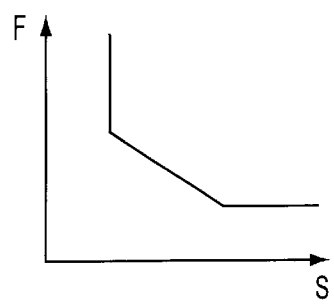

FIG. 8a shows the case of a support element that can move freely. This support element produces a constant rising force F over the displacement S. Such a case occurs, for example, when support element 10 is arranged in beading ring 7 without a spring or, as in the embodiment according to FIG. 5, when it can move over a small lift without the influencing of the spring. In contrast, if support element 10 meets rigid stop, such as, e.g., in the embodiment according to FIG. 7, the displacement over the force virtually no longer changes, as depicted in FIG. 8b. When, as shown in FIG. 8d, the three cases 8a–8c are combined, virtually any desired spring characteristic can be set, as shown in FIG. 8d.

If springs 61–63 are pre-tensioned while the individual parts of the bearing are being mounted, a play between support element 10 and springs 61, 62, 64 is therefore eliminated, and a play-free roll bearing is obtained. The bearing reacts immediately with a restoring force at each movement of the bearing. Compared with the seating on a roll bearing, this represents a great advantage. An alternating load reaction is much softer (damped) than with a bearing affected by play. When the force acceptance of the spring is exhausted, the load acceptance of the bearing can be increased by an additional stop, as described above.

FIG. 7 furthermore shows that a throttle 65 is arranged in feed line 16'. throttle 65 is only shown schematically here. It can be implemented by various measures, for example, capillary lines, narrow bores, or the like.

Figure 9:
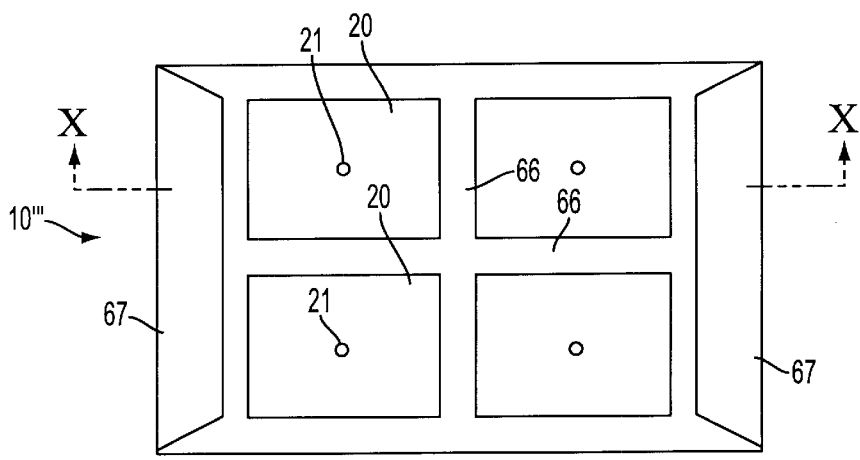
FIGS. 9 illustrates a top view of a support element of the invention.
Figure 10:
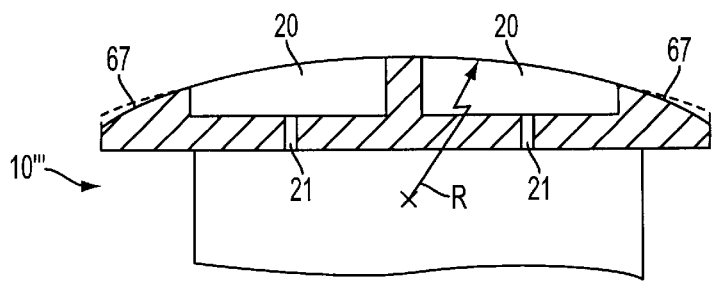
FIG. 10 illustrates a sectional view through a support element of the invention.

FIG. 9 shows in top view a support element 10''', which can be used in place of support element 10 in FIGS. 1 to 3. Support element 10''' has bearing pockets 20 that are supplied by capillaries 21. Bearing pockets 20 are separated from one another by bridges 66. In addition, support element 10''' has tapered areas 67 on both its ends in the circumferential direction, i.e., areas in which the support surface of support element 10''' facing the roll jacket no longer has the radius R of the inner side of roll jacket 2, but is smaller and wedge-shaped, as shown in FIG. 10. In these tapered are, which are known per se, a hydrodynamic "carrier zone" can be formed in operation, which leads to better emergency running properties and lower energy consumption.

Figure 11:
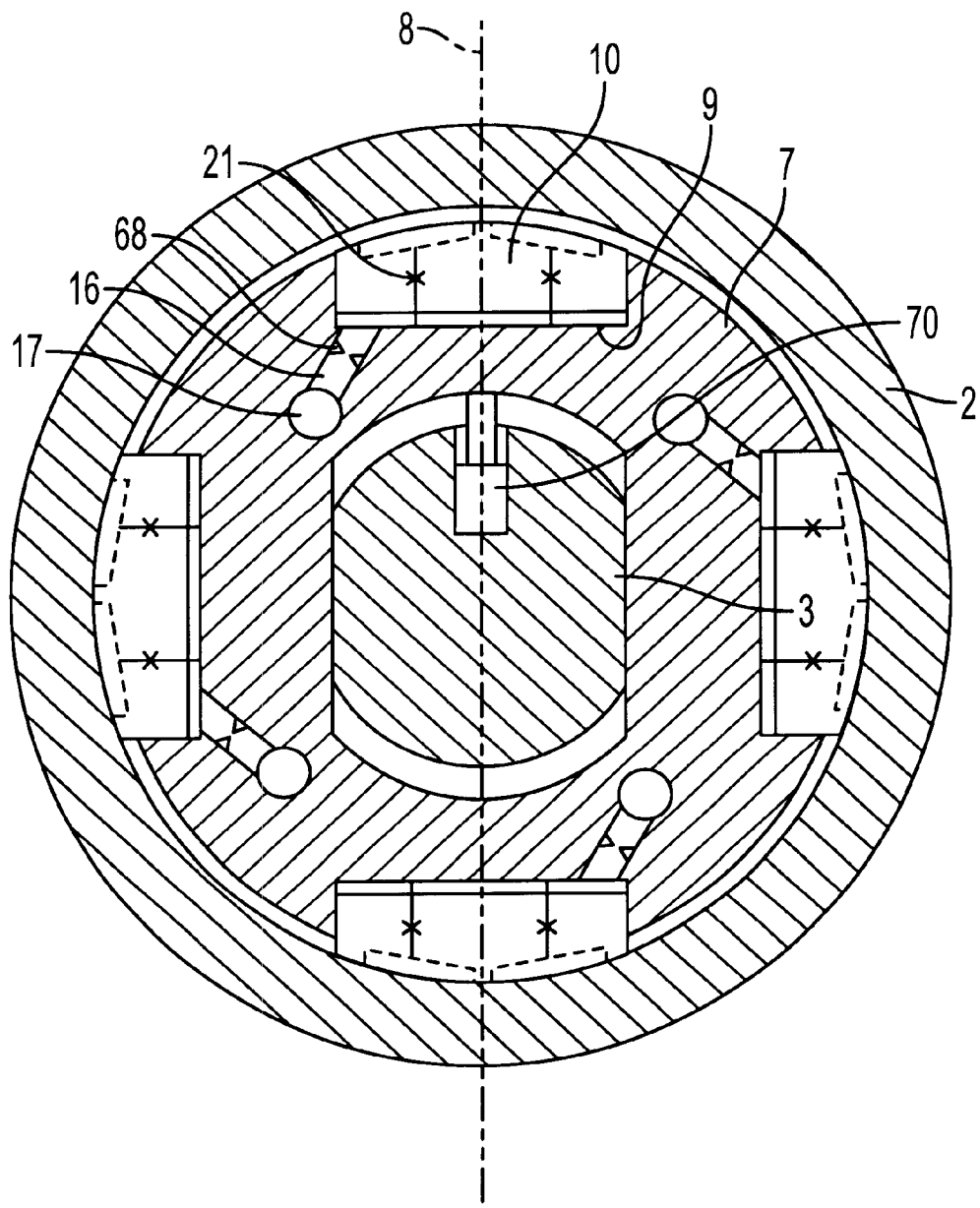
FIG. 11 illustrates a cross sectional view of a further embodiment of a roll of the invention, which generally corresponds to the view depicted in FIG. 3.

FIG. 11 shows a cross section of another example of the roll, which basically correspond to the cross section of FIG. 3. The same parts are provided with the same reference numbers. A force device 70, e.g., a hydraulic piston-cylinder arrangement, has been added between carrier 3 and bearing ring 7. This force device acts in the radial direction, in press plane 8. With the aid of force device 70, it is possible to bring additional forces to bear on roll jacket 2 in the bearing area as well. When force device 70 is designed so that it acts bilaterally or a corresponding force device can act in the other direction, it is possible to load roll jacket 2 in the bearing area so that it reduces its pressure in the nip with an opposing roll, not shown in more detail.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A sag compensation roll comprising:
    a rotatable roll jacket;
    a non-rotating carrier being located inside said roll jacket;
    a hydraulic support element arrangement being located between said carrier and said roll jacket;
    a bearing ring located at each end of said roll jacket, said bearing rings being movable relative to said carrier in a press plane;
    a bearing arrangement being located between said bearing rings and said roll jacket, said bearing arrangement comprising at least three support elements distributed in a circumferential direction;
    a bearing pocket arrangement arranged on at least one of the at least three support elements, the bearing pocket being coupled to a supply device; and
    said supply device arranged to deliver a constant volume flow of hydraulic fluid,
    wherein said at least one of said at least three support elements is movable with respect to said bearing ring, and
    wherein, under load, said at least one movable support element is driven into said bearing ring up to a fixed position.

2. The roll in accordance with claim 1, wherein said at least three support elements comprise at least three hydrostatic support elements.

3. The roll in accordance with claim 1, said bearing pocket arrangement has an effective surface which is greater than a surface of said at least one movable support element on which a pressure acts between said bearing ring and said support element.

4. The roll in accordance with claim 3, further comprising:
    a pressure chamber being located between said support element and said bearing ring; and
    said at least one movable support element comprising a capillary arrangement positioned to couple said bearing pocket arrangement to said pressure chamber.

5. The roll in accordance with claim 4, wherein said capillary arrangement is dimensioned so that, in an unloaded state, a predetermined initial stressing force is not exceeded, and, at a predetermined load, a predetermined minimum gap height is attained.

6. The roll in accordance with claim 4, wherein said supply device is matched to said capillary arrangement so that, under maximum load, a minimum gap in the range of between about 20–30 $\mu$m is formed between said support element and said roll jacket.

7. The roll in accordance with claim 1, wherein said at least one movable support element has a lift height with respect to said bearing ring in a radical direction which corresponds to a maximum change resulting from thermal differences in one of at least one diameter, the roll jacket and carrier deformations arising from nip loads.

8. The roll in accordance with claim 7, wherein the lift height is in a range of between about 0.1–0.5 mm.

9. The roll in accordance with claim 7, wherein the lift height is in a range of between about 0.1–0.3 mm.

10. The roll in accordance with claim 1, wherein at least one of said at least three support elements has a curved floor on an underside positioned to face said carrier.

11. The roll in accordance with claim 1, at least one of said at least three support elements is arranged in a cylinder housing having a concave curved floor which is supported on a correspondingly curved convex surface a side of said carrier.

12. The roll in accordance with claim 1, wherein said support elements at one end of said roll compose a curved support surface arranged to lie against a similarly curved bearing surface on an inner side of said roll jacket.

13. The roll in accordance with claim 12, wherein said curved support surface is curved along a circular line which results in a radial section.

14. The roll in accordance with claim 1, wherein one of said bearing rings is axially positioned against said roll jacket via hydrostatic slip surfaces.

15. The roll in accordance with claim 1, wherein said bearing rings are arranged on end sections of said carrier, and said end sections have a smaller diameter than a section of said carrier axially between said end sections.

16. The roll in accordance with claim 1, further comprising a spring being arranged between said bearing ring and said support element.

17. The roll in accordance with claim 16, wherein said at least one movable support element has a stop that can be moved parallel to said spring, and
    wherein said stop comes to rest against said bearing ring after a predetermined spring displacement.

18. The roll in accordance with claim 16, wherein a maximum spring displacement is shorter than a maximum lift of said at least one movable support element.

19. The roll in accordance with claim 1, wherein a support surface of said at least on movable support element comprises at least one tapered approach edge.

20. The roll in accordance with claim 1, further comprising a force device arranged between said carrier and said bearing ring, wherein the force device acts in a radially oriented press plane.

21. The roll in accordance with claim 1, wherein said at least one movable support element is positioned for movement within a pressure chamber in said bearing ring, and said roll further comprises a throttle arranged in a line coupled to said pressure chamber.

22. A process for operating a sag compensation roll having a roll jacket that rotates around a carrier and that is supported in the area of its axial ends by a bearing arrangement having a bearing ring and at least three hydrostatic support elements with bearing pockets circumferentially distributed over the bearing ring, said process comprising:
    supplying the bearing pockets with a constant volume flow of hydraulic fluid; and
    driving at least one support element into the bearing ring under load up to a fixed position.

23. The process according to claim 22, further comprising conducting the hydraulic fluid in the at least one support element through a capillary arrangement.

24. The process according to claim 23, wherein an effective surface of the bearing pocket arrangement is formed to be greater than a cross sectional surface of the support element in the bearing ring.

25. A sag compensation roll comprising:

a rotatable roll jacket;

a non-rotating carrier being located inside said roll jacket;

a hydraulic support element arrangement being located between said carrier and said roll jacket;

bearing rings comprising a bearing ring located at each end of said roll jacket, said bearing rings being movable relative to said carrier in a press plane; and a bearing arrangement being located between said bearing rings and said roll jacket, said bearing arrangement comprising at least three support elements distributed in a circumferential direction, wherein said at least one of said at least three support elements is movable with respect to said bearing ring, and wherein said at least one movable support element has a lift height with respect to said bearing ring in a radial direction which corresponds to a maximum change resulting from thermal differences in one of at least one diameter, the roll jacket and carrier deformations arising from nip loads.

26. A sag compensation roll comprising:

a rotatable roll jacket;

a non-rotating carrier being located inside said roll jacket;

a hydraulic support element arrangement being located between said carrier and said roll jacket;

bearing rings comprising a bearing ring located at each end of said roll jacket, said bearing rings being movable relative to said carrier in a press plane; and a bearing arrangement being located between said bearing rings and said roll jacket, said bearing arrangement comprising at least three support elements distributed in a circumferential direction, wherein said at least one of said at least three support elements is movable with respect to said bearing ring, and wherein said at least one of said at least three support elements has a curved floor on an underside positioned to face said carrier.

* * * * *